(12) United States Patent
Sheppard et al.

(10) Patent No.: US 11,180,003 B2
(45) Date of Patent: Nov. 23, 2021

(54) SUPPORT FOR A VEHICLE WINDOW

(71) Applicants: Gloria J Sheppard, Toledo, OH (US); Nick F Bursic, Jr., Oakville (CA); Harry J Glikis, Dearborn, MI (US); Keith P Windmill, Shelby Township, MI (US); Rachelle E LaLonde, Birmingham, MI (US)

(72) Inventors: Gloria J Sheppard, Toledo, OH (US); Nick F Bursic, Jr., Oakville (CA); Harry J Glikis, Dearborn, MI (US); Keith P Windmill, Shelby Township, MI (US); Rachelle E LaLonde, Birmingham, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 16/783,355

(22) Filed: Feb. 6, 2020

(65) Prior Publication Data

US 2021/0245581 A1  Aug. 12, 2021

(51) Int. Cl.
*B60J 1/00* (2006.01)
*B60J 10/70* (2016.01)

(52) U.S. Cl.
CPC ............... *B60J 1/005* (2013.01); *B60J 1/006* (2013.01); *B60J 10/70* (2016.02)

(58) Field of Classification Search
CPC ... B60J 1/004; B60J 1/005; B60J 1/006; B60J 1/007; B60J 10/70
USPC .................................................. 296/146.15
See application file for complete search history.

(56) References Cited

U.S. PATENT DOCUMENTS

| 4,635,420 A * | 1/1987 | Batky | B29C 63/003 156/108 |
| 5,308,135 A * | 5/1994 | Stedman | B60J 1/005 296/201 |
| 5,765,310 A * | 6/1998 | Gold | B60J 1/17 49/375 |
| 6,151,847 A | 11/2000 | Okuniewicz et al. | |
| 7,604,280 B2 | 10/2009 | Katcherian | |
| 2003/0227191 A1 * | 12/2003 | Okamoto | B60J 10/70 296/96.22 |
| 2006/0186704 A1 * | 8/2006 | Sakai | B62D 25/105 296/192 |

FOREIGN PATENT DOCUMENTS

| FR | 2916817 A1 * | 12/2008 | ............. B62D 27/06 |
| GB | 2411382 A * | 8/2005 | ........... B62D 25/105 |

\* cited by examiner

*Primary Examiner* — Hilary L Gutman
(74) *Attorney, Agent, or Firm* — Ralph E. Smith

(57) ABSTRACT

A support for a vehicle window includes a body first, second and third portions that define a channel between them adapted to receive the window therein. The first portion has a first surface that defines one side of the channel, the second portion has a second surface that defines an opposite side of the channel and the third portion has a third surface that defines a base of the channel. The first portion includes a breakable area that is located at a junction between the first surface and third surface, or the breakable area is located between the third surface and a free end of the first portion and is adapted to break under a lower force than are other portions of the body so that the second portion and third portion of the body are separated from the first portion.

20 Claims, 3 Drawing Sheets

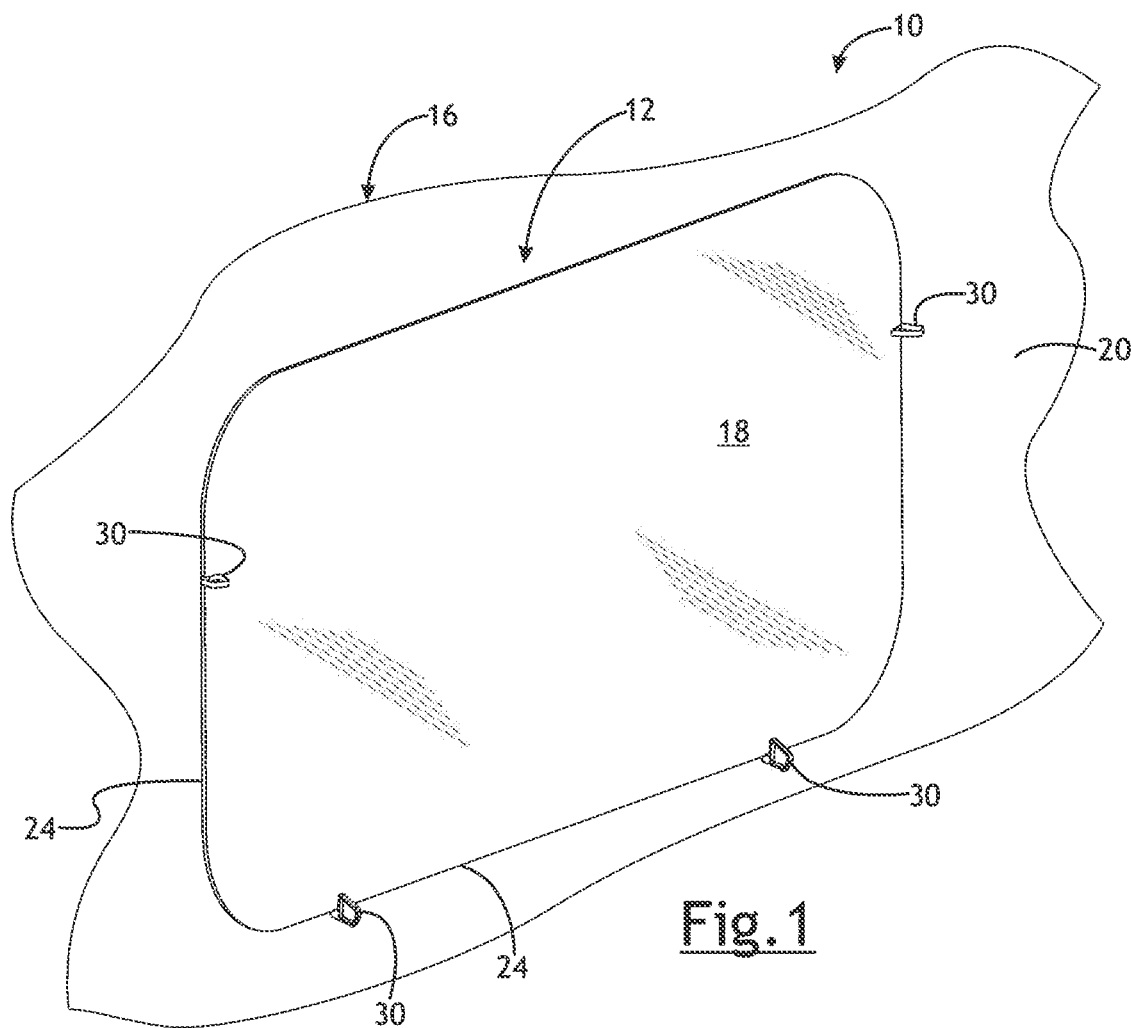
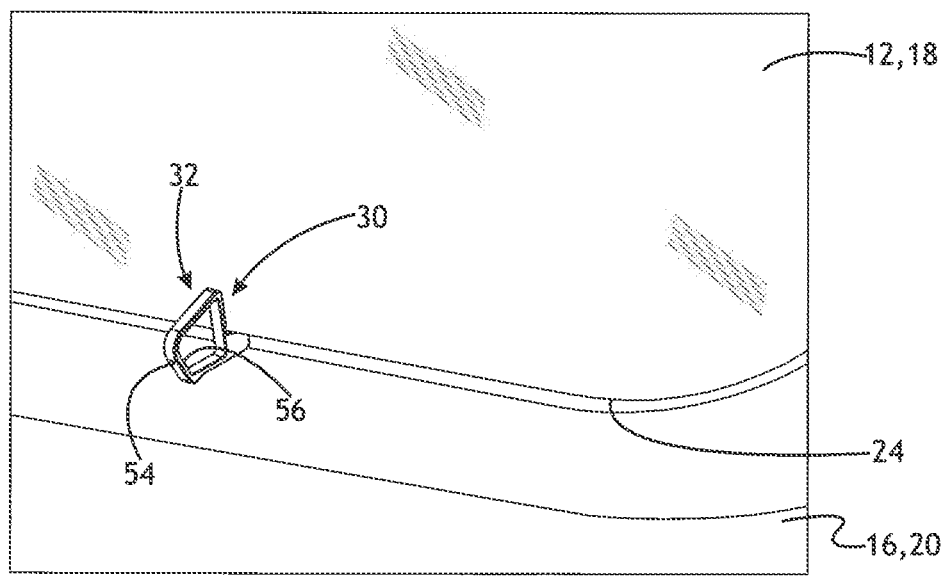

SUPPORT FOR A VEHICLE WINDOW

FIELD

The present disclosure relates to a support for a vehicle window that may be used to position a window during installation of the window.

BACKGROUND

Vehicle windows may be bonded to a vehicle body by an adhesive. The adhesive is applied in a flowable state and then cures to a firmer state. Clips are sometimes used to position the window relative to the vehicle during installation, but removal of the clips can scratch or break at least certain types of windows. Removal of the clips may be difficult to do manually, for example where the adhesive has bonded to part of the clip, and such removal may disrupt the adhesive and provide a leak path for water or other contaminants and wind. In any event, removal may be difficult to perform on a repetitive basis for many vehicles.

SUMMARY

In at least some implementations, a support for a vehicle window includes a body having a first portion, a second portion spaced from the first portion, and a third portion interconnecting the first portion and the second portion, where the first portion, second portion and third portion define a channel between them adapted to receive the window therein. The first portion has a first surface that defines one side of the channel, the second portion has a second surface that defines an opposite side of the channel and the third portion has a third surface that defines a base of the channel. The first portion includes a breakable area that is located at a junction between the first surface and third surface, or the breakable area is located between the third surface and a free end of the first portion and is adapted to break under a lower force than are other portions of the body so that the second portion and third portion of the body are separated from the first portion.

In at least some implementations, the breakable area is defined by an area of the first portion having a reduced cross-sectional area. The first portion may include one or more voids formed therein and which define at least part of the area having a reduced cross-sectional area. The breakable area may be defined by an area of the first portion that is more brittle than the remainder of the body. The breakable area may be formed by an area that is harder than the remainder of the body.

In at least some implementations, the first portion includes a flange arranged parallel to the base of the channel or within twenty degrees of parallel to the base of the channel. The flange may include a void formed therein.

In at least some implementations, the second portion of the body includes a handle that is manually graspable, and the handle may include an opening.

In at least some implementations, both the first surface and the second surface are perpendicular to the third surface, or within twenty degrees of perpendicular to the third surface. A minimum distance between the first surface and the second surface may be equal to or less than the thickness of the window with which the support is used.

In at least some implementations, the thickness of the third portion of the support body measured between a first side at a first end of the channel, and a second side at a second end of the channel, is equal to or less than the distance between the third surface and the outer surface of the third portion that is located opposite to the third surface. The outer surface may be adapted to contact the vehicle body to provide the third surface at a fixed distance from the vehicle body, wherein the fixed distance is equal to the distance between the third surface and the outer surface.

In at least some implementations, a support for a vehicle window includes a body having a first portion, a second portion spaced from the first portion, and a third portion interconnecting the first portion and the second portion. The first portion, second portion and third portion define a channel with the first portion forming one side of the channel, the second portion defining an opposite side of the channel and the third portion defining a base of the channel. The first portion includes a breakable area that is adapted to break under a lower force than are the second portion and third portion of the body so that the second portion and third portion of the body are separated from the first portion when the first portion breaks.

In at least some implementations, a thickness of the third portion measured between a first side of the third portion located at a first end of the channel, and a second side of the third portion located at a second end of the channel, is equal to or less than the distance between the surface that defines the base of the channel and an outer surface of the third portion that is located opposite to the surface that defines the base of the channel. The breakable area may be defined by an area of the first portion having one or more of the following features or properties: 1) a reduced cross-sectional area compared to the second portion and third portion, 2) an area that is more brittle than the remainder of the body, and/or 3) an area that is harder than the remainder of the body.

In at least some implementations, the first portion includes a flange arranged parallel to the base of the channel or within twenty degrees of parallel to the base of the channel. The flange may include a void formed therein, which may increase the surface area of engagement with an adhesive applied to the window and vehicle body.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

BRIEF DESCRIPTION OF THE DRAWINGS

FIG. 1 is a perspective view of a vehicle window including multiple supports installed between the window and a vehicle body;

FIG. 2 is an enlarged view of a portion of FIG. 1 showing one of the supports;

DETAILED DESCRIPTION

Figure 6:
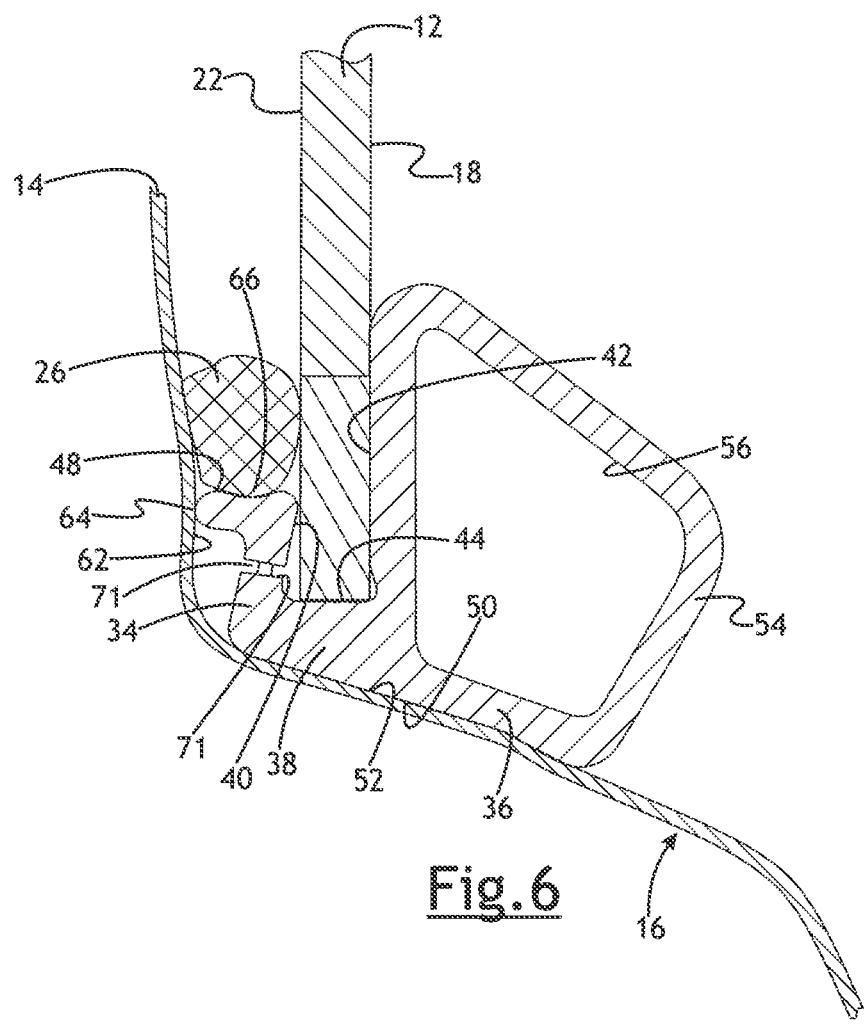
FIG. 6 is a sectional view showing a support in position with respect to the window and vehicle body.

Referring in more detail to the drawings, FIGS. 1 and 6 illustrate a portion of an exterior of a vehicle 10 that has a fixed window 12 mounted in an opening 14 (FIG. 6) of a vehicle body 16. An outer surface 18 of the window 12, and the exterior surface 20 of the portion of the vehicle body 16 surrounding the window 12, define show surfaces that are visible from the exterior of the vehicle. An inner surface 22 (FIG. 6) of the window 12 may define a boundary of a passenger compartment of the vehicle. The perimeter or outer edge 24 of the window 12 may overlap the vehicle body 16 and be fixed thereto.

The window 12 is typically fixed to the vehicle body 16 by an adhesive 26 (FIG. 6), that is usually applied as a continuous bead between the inner surface 22 of the window 12 and a portion of the vehicle body 16 facing outwardly (e.g. toward the exterior/outside of the vehicle) and overlapped by and behind the window 12. The adhesive 26 both holds the window 12 in place relative to the vehicle body 16 and creates a seal between them that prevents water or wind intrusion into the passenger compartment of the vehicle. The adhesive 26 is applied in a flowable state and then cures to a firmer state as is known in the art. It may take some time for the adhesive 26 to cure and the vehicle assembly process typically does not pause for this to occur. Further vehicle assembly and/or shipping of the vehicle may occur as the adhesive 26 cures.

To prevent shifting of the window 12 relative to the vehicle body 16 as the adhesive 26 cures, and/or for other reasons (e.g. to retain adhesive 26 between the window 12 and vehicle body 16), one or more supports 30 may be provided. The supports 30 may have a portion that engages the vehicle body 16 and a portion that engages the window 12 to maintain the window 12 in a desired position relative to the vehicle body 16.

In more detail, as shown in FIGS. 2-6, the supports 30 may include a body 32 that has a first portion 34, a second portion 36 spaced from the first portion 34, and a third portion 38 interconnecting the first portion 34 and the second portion 36. The first portion 34, second portion 36 and third portion 38 include first, second and third surfaces 40, 42, 44, respectively that define a channel 46 between them that is adapted to receive a portion of the window 12 therein. In at least some implementations: 1) the first surface 40 defines one side of the channel 46 and engages a portion of the inner surface 22 of the window 12 adjacent to the outer edge 24 of the window 12, 2) the second surface 42 defines an opposite side of the channel 46 and engages a portion of the outer surface 18 of the window 12 adjacent to the outer edge 24 of the window 12; and 3) the third surface 44 defines a base of the channel 46 and may engage the outer edge 24 of the window 12.

In at least some implementations, one or both of the first surface 40 and the second surface 42 are perpendicular to the third surface 44, or within fifteen degrees of perpendicular to the third surface 44. Thus, a generally U-shaped channel 46 is created between the first and second surfaces 40, 42, with the third surface 44 extending between the first and second surfaces 40, 42 and defining a closed base of the channel 46. The first surface 40 and second surface 42 may be parallel to each other or arranged at any desired angle. A minimum distance between the first surface 40 and the second surface 42 may, in at least some implementations, be equal to or less than the thickness of a window 12 or pane of glass with which the support 30 is used. In this way, the window 12 or pane may be received with a line fit or friction fit between the first and second surfaces 40, 42. Among other things, this may enable the support 30 to remain attached to the window 12 without requiring an adhesive 26 or other connector to hold the support 30 in place relative to the window 12. Of course, the support 30 or window 12 could include an adhesive or other substance to bond or increase friction between the support 30 and window 12, or a connector to aid in holding/retaining the support 30 on the window 12, if desired. The minimum distance may be defined at or adjacent to a free end 48 of the first portion 34, which defines part of the open, upper end of the channel 46, such that the channel 46 has less width near the upper end of the channel 46 than at or near the base (e.g. third surface 44), where the width is the distance between the first and second surfaces 40, 42, measured parallel to the base.

As shown in FIG. 6, when the support 30 is installed on a window 12, the first portion 34 is received adjacent to the inner surface 22 (i.e. on the opposite side of the window 12 as the outer surface 18) and the second portion 36 is received adjacent to the outer surface 18 (i.e. on the opposite side of the window 12 as the inner surface 22) and the third portion 38 is arranged between the window 12 and the vehicle body 16. An outer surface 50 of the third portion 38 may engage a first locating surface 52 of the vehicle body 16 such that at least part of the third portion 38 is trapped between the window 12 and the vehicle body 16. The first locating surface 52 is arranged at a non-zero angle to the window 12, and may be perpendicular to the window 12 or within 40 degrees of perpendicular. In this way, the thickness of the third portion 38 may define a distance of the outer edge 24 of the portion of the window 12 within the support 30 from the first locating surface 52 of the vehicle body 16.

In at least some implementations, the second portion 36 includes a handle 54 that extends outwardly from the outer surface 18 of the window 12 and which may include an opening 56 therethrough. The second portion 36 may extend perpendicular to the outer surface 18 of the window 12 or within thirty degrees of perpendicular to the outer surface 18 of the window 12. In the example shown, the second portion 36 completely bounds the opening 56 through which a user's finger or thumb may be received to facilitate installation of a clip on the window 12 and removal of the clip from the window 12. The opening 56 could instead be partially bounded by the second portion 36, if desired. The second portion 36 may have a greater height than the first portion 34, where the height is measured perpendicular to the third surface 44 and from the third surface 44 to a distal end 58 of the second surface 42 which defines part of the open, upper end of the channel 46. The increased height provides a larger area of the support 30 which may be manipulated by a user, and a larger surface area for the second surface 42 for improved retention of the support 30 on a window 12.

In at least some implementations, the first portion 34 has a locating feature 60, such as a part of the first portion 34 that is wider, that is adapted to engage a second locating surface 62 (FIG. 6) of the vehicle body 16. The width of the first portion 34 generally, and of the locating feature 60, may be measured parallel to the third surface 44 in the direction extending between the first and second surfaces 40, 42. The second locating surface 62 may be arranged parallel to the window 12 or within twenty degrees of parallel to the window 12, and is arranged between the window 12 and the passenger compartment (which is to say adjacent to the inner surface 22 of the window 12).

In this way, the width of the locating feature 60 may define a distance of the inner surface 22 of the portion of the window 12 within the support 30 from the second locating surface 62 of the vehicle body 16. In the example shown, the locating feature 60 of the first portion 34 is defined by a flange 60 which may be wider than other parts of the first portion 34 and which may be located at the free end 48. The flange 60 may have an outer surface 64 that is opposite to the first surface 40 and that engages the second locating feature 62, as shown in FIG. 6. The flange 60 may also define or include the free end 48 of the first portion 34 and the adhesive bead may directly contact the free end 48 of the first portion 34. To increase the bond between the adhesive 26 and the first portion 34, the free end 48 may include a void 66 (FIGS. 3 and 6), such as one or more cavities or grooves into which the adhesive 26 may flow. Further, the free end 48 may be parallel to or within twenty degrees of parallel to the third surface 44, and/or perpendicular to, or within twenty degrees of perpendicular to the inner surface 22 of the window 12.

The first portion 34 may include a breakable area 70 at which the support 30 may break to facilitate removal of the remainder of the support 30 from the vehicle. In at least some implementations, at least part of the first portion 34 is therefore adapted to remain behind the window 12 after the remainder of the support 30 is removed. That portion extends from the free end 48, which may be bonded to the adhesive 26, to the breakable area 70. The breakable area 70 may be located between the free end 48 and the third surface 44, or at a junction 73 (FIG. 3) of the first surface 40 with the third surface 44 so that the broken portion of the support 30, which remains behind the window 12 (e.g. adjacent to the inner surface 22) after the support 30 is broken, is overlapped or covered by the window 12 and is not exposed or easily viewable around the outer edge 24 of the window 12. The breakable area 70 is adapted to break under a lower force than are other portions of the body 32 so that the second portion 36 and third portion 38 of the body 32 are separated from the first portion 34.

Figure 3:
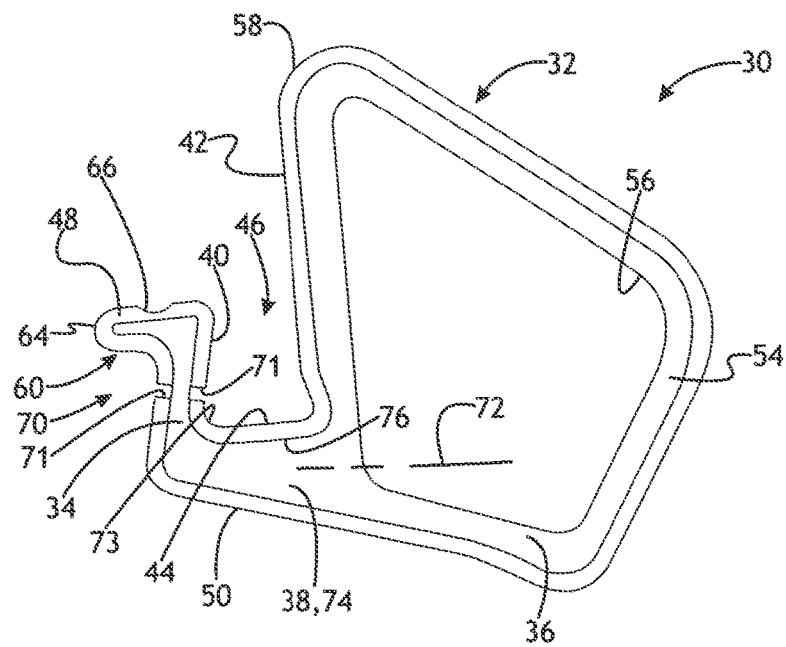
FIG. 3 is a side view of a support.
Figure 4:
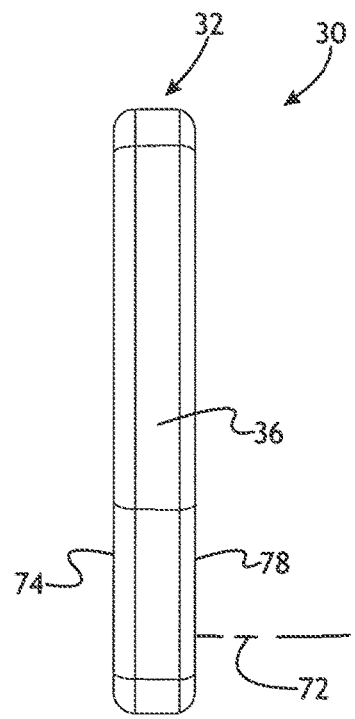
FIG. 4 is an end view of the support.
Figure 5:
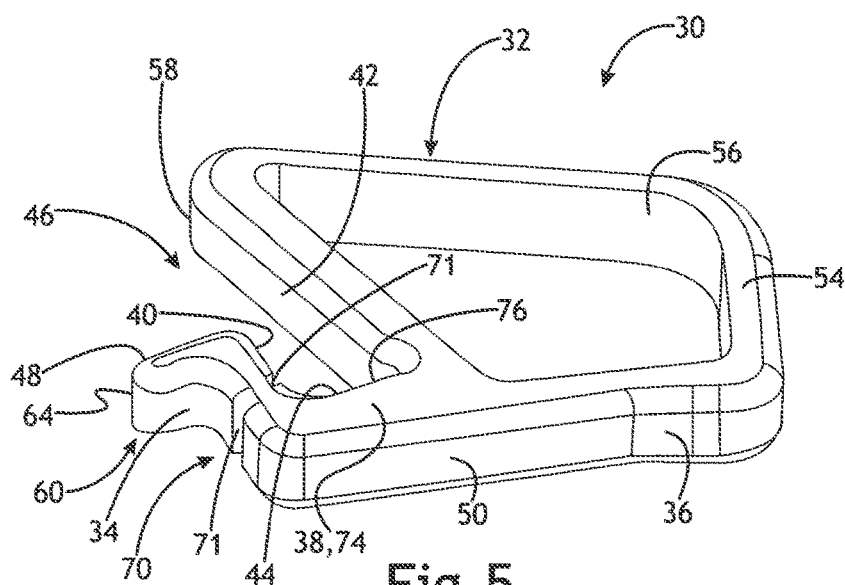
FIG. 5 is a perspective view of the support.

In at least some implementations, the breakable area 70 is defined by an area of the first portion 34 having a reduced cross-sectional area. This is shown in FIGS. 3, 4 and 6 wherein the breakable area 70 of the first portion 34 has less width than other areas of the first portion 34. The decreased width or thickness may be defined by voids 71 (FIGS. 3, 5 and 6) or notches or a slot in one or both of the first surface 40 and opposite surface of the first portion 34, which provide the breakable area 70 with a reduced cross-sectional area compared to the rest of the first portion 34. In at least some implementations, the breakable area 70 is defined by an area of the first portion 34 that is more brittle and/or harder than the remainder of the body 32. This may be achieved by heating or drying out the breakable area 70 of the body 32, by providing the breakable area 70 with an insert, filler or other material different from that used to form the remainder of or other portions of the body 32. Or other portions of the body 32 may include reinforcements or fillers, like fiberglass or glass or nylon fibers that increase the strength of those portions while the breakable area 70 has less or none of such fillers and is therefore weaker and easier to fracture. In at least some implementations, the material may have a tensile strength of between 30 to 50 Mpa and/or a Rockwell M hardness of 50-80.

In at least some implementations, as shown in FIG. 1, one or more supports 30 may hold the window 12 against movement in a vertical direction which generally is the direction between a roof of the vehicle and the ground. And one or more supports 30 may hold the window 12 against movement in a horizontal direction, which generally is the direction between the front and rear of the vehicle. The supports 30 may be identical, if desired, or they may be of different sizes to position a window 12 as desired relative to the vehicle. The supports 30 may be coupled to the window 12 by pressing the support 30 onto the window 12, with the window 12 received in the channel 46 of each support. The supports 30 may be spaced apart to positively position the window 12 by engagement of the window 12 with the supports 30 and the supports 30 with the vehicle body 16 at different locations of the window 12. In at least some implementations, friction is sufficient to hold the supports 30 in a desired location and orientation relative to the window 12. The window 12 may then be positioned relative to an opening 14 in the vehicle body 16 with the adhesive bead, which may be applied to the window 12 prior to pressing the window 12 against the vehicle body 16, trapped between the window 12 and vehicle body 16.

Later, when the adhesive 26 is sufficiently cured, the supports 30 may be removed from the window 12. To do this, a user may grasp the second portion 36 of the support body 32 and twist it about the third portion 38 (e.g. an axis or centerline 72 (FIGS. 3 and 4) of the third portion 38, or along a plane parallel to the outer surface 18 of the window 12). The first portion 34 of the support body 32 is at least partially held against such rotation, by one or both of the adhesive 26 and friction between the flange 60 and the second locating surface 62. Thus, the body 32 may become twisted, at least momentarily, until the first portion 34 fractures at the breakable area 70. Part of the first portion 34, from the free end 48 to the fracture point of the breakable area 70, may remain in place between the window 12 and vehicle body 16, and the remainder of the support 30 may be removed.

To remove the remainder of the support 30, it is rotated until the third surface 44 is perpendicular to or within ten degrees of perpendicular to the outer edge 24 of the window 12 that was received in the channel 46 prior to rotation of the support 30 relative to the window 12. When so rotated, the support body 32 may be removed from the space between the outer edge 24 of the window 12 and the vehicle body 16. This is so because the thickness of the third portion 38 of the support body 32 (and of the part of the first portion 34, if any, that is removed with the remainder of the support), measured between a first side 74 at a first end 76 of the channel 46, and a second side 78 at a second end of the channel 46 is equal to or less than the distance between the third surface 44 and the outer surface 50 of the third portion 38. Thus, in the area of the support 30 being removed, the outer edge 24 of the window 12 is spaced from the vehicle body 16 by a distance greater than the thickness of the third portion 38 and any removed portion of the first portion 34 (e.g. part of the first portion 34 between the fracture point and the third portion 38).

What is claimed is:

1. A support for a vehicle window, comprising:
a body having a first portion, a second portion spaced from the first portion, and a third portion interconnecting the first portion and the second portion, wherein the first portion, second portion and third portion define a channel between them adapted to receive the window therein, the first portion having a first surface that defines one side of the channel, the second portion having a second surface that defines an opposite side of the channel and the third portion having a third surface that defines a base of the channel, and wherein the first portion includes a breakable area that is located at a junction between the first surface and third surface, or the breakable area is located between the third surface and a free end of the first portion and is adapted to break under a lower force than are other portions of the body so that the second portion and third portion of the body are separated from the first portion, wherein the first portion includes a locating surface adapted to engage a second locating surface of a vehicle to locate the channel relative to the second locating surface, and the first surface is adapted to engage an inner surface of the window.

2. The support of claim 1 wherein the breakable area is defined by an area of the first portion having a reduced cross-sectional area.

3. The support of claim 2 wherein the first portion includes one or more voids formed therein and which define at least part of the area having a reduced cross-sectional area.

4. The support of claim 1 wherein the breakable area is defined by an area of the first portion that is more brittle than the remainder of the body.

5. The support of claim 1 wherein the breakable area is formed by an area that is harder than the remainder of the body.

6. The support of claim 1 wherein the locating surface of the first portion includes a flange arranged parallel to the base of the channel or within twenty degrees of parallel to the base of the channel.

7. The support of claim 6 wherein the flange includes a void formed therein.

8. The support of claim 1 wherein both the first surface and the second surface are perpendicular to the third surface, or within fifteen degrees of perpendicular to the third surface.

9. The support of claim 8 wherein a minimum distance between the first surface and the second surface is equal to or less than the thickness of the window with which the support is used.

10. The support of claim 1 wherein the thickness of the third portion of the support body measured between a first side at a first end of the channel, and a second side at a second end of the channel, is equal to or less than the distance between the third surface and an outer surface of the third portion that is located opposite to the third surface.

11. The support of claim 10 wherein the outer surface is adapted to contact the vehicle body to provide the third surface at a fixed distance from the vehicle body, wherein the fixed distance is equal to the distance between the third surface and the outer surface.

12. The support of claim 1 wherein the body is symmetric and the breakable area may be broken by rotation of the body in either of two opposite directions.

13. A support for a vehicle window, comprising:
a body having a first portion, a second portion spaced from the first portion, and a third portion interconnecting the first portion and the second portion, wherein the first portion, second portion and third portion define a channel between them adapted to receive the window therein, the first portion having a first surface that defines one side of the channel, the second portion having a second surface that defines an opposite side of the channel and the third portion having a third surface that defines a base of the channel, and wherein the first portion includes a breakable area that is located at a junction between the first surface and third surface, or the breakable area is located between the third surface and a free end of the first portion and is adapted to break under a lower force than are other portions of the body so that the second portion and third portion of the body are separated from the first portion, wherein the second portion of the body includes a handle that is manually graspable.

14. The support of claim 13 wherein the handle includes an opening.

15. A support for a vehicle window, comprising:
a body having a first portion, a second portion spaced from the first portion, and a third portion interconnecting the first portion and the second portion, wherein the first portion, second portion and third portion define a channel with the first portion forming one side of the channel, the second portion defining an opposite side of the channel and the third portion defining a base of the channel, and wherein the first portion includes a breakable area that is adapted to break under a lower force than are the second portion and third portion of the body so that the second portion and third portion of the body are separated from the first portion when the first portion breaks, wherein the first portion is adapted to engage a portion of an inner surface of a window and a portion of a vehicle body, and the second portion is adapted to engage a portion of an outer surface of the window that defines a show surface of the window that is visible from an exterior of the vehicle.

16. The support of claim 15 wherein a thickness of the third portion measured between a first side of the third portion located at a first end of the channel, and a second side of the third portion located at a second end of the channel, is equal to or less than the distance between the surface that defines the base of the channel and an outer surface of the third portion that is located opposite to the surface that defines the base of the channel.

17. The support of claim 15 wherein the breakable area is defined by an area of the first portion having one or more of the following features or properties: 1) a reduced cross-sectional area compared to the second portion and third portion, 2) an area that is more brittle than the remainder of the body, and/or 3) an area that is harder than the remainder of the body.

18. The support of claim 15 wherein the first portion includes a flange arranged parallel to the base of the channel or within twenty degrees of parallel to the base of the channel.

19. The support of claim 18 wherein the flange includes a void formed therein.

20. The support of claim 15 wherein the second portion of the body includes a handle that is manually graspable.

* * * * *